United States Patent
Navrátil et al.

(10) Patent No.: US 11,522,803 B2
(45) Date of Patent: Dec. 6, 2022

(54) METHOD AND APPARATUS FOR HANDLING PACKET DELAY BUDGET DIVISION AND QUALITY OF SERVICE MONITORING IN A COMMUNICATION SYSTEM

(71) Applicant: Nokia Technologies Oy, Espoo (FI)

(72) Inventors: David Navrátil, Helsinki (FI); Devaki Chandramouli, Plano, TX (US); Troels Kolding, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/792,700

(22) Filed: Feb. 17, 2020

(65) Prior Publication Data

US 2020/0267088 A1     Aug. 20, 2020

Related U.S. Application Data

(60) Provisional application No. 62/806,991, filed on Feb. 18, 2019.

(51) Int. Cl.
*H04L 47/32*     (2022.01)
*H04L 43/0852*     (2022.01)
(Continued)

(52) U.S. Cl.
CPC .......... *H04L 47/32* (2013.01); *H04L 41/5003* (2013.01); *H04L 43/0852* (2013.01); *H04L 43/16* (2013.01); *H04L 47/283* (2013.01)

(58) Field of Classification Search
CPC ............. H04L 43/0852; H04L 43/0858; H04L 43/0864; H04L 43/087; H04L 47/17; H04L 47/283; H04L 47/35
See application file for complete search history.

(56) References Cited

U.S. PATENT DOCUMENTS 8,861,352 B2   10/2014  Bejerano
9,124,482 B2    9/2015  Vasseur et al.
(Continued)

FOREIGN PATENT DOCUMENTS

JP       6048102 B2    12/2016

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.0.0, Dec. 2018, pp. 1-76.

(Continued)

*Primary Examiner* — Pao Sinkantarakorn
(74) *Attorney, Agent, or Firm* — Alston & Bird LLP

(57) ABSTRACT

A method, apparatus and computer program product receive, at a network node of a communication network, information about an accumulated packet delay in the communication network. The method, apparatus and computer program product estimate next hop transport delay and estimate or measure a processing delay of the network node. The method, apparatus and computer program product update the accumulated packet delay by adding the next hop transport delay and the processing delay to the accumulated packet delay. The method, apparatus and computer program product cause transmission of information about the accumulated packet delay in a header of a packet carrying user data or a control packet in the communication network to a next hop node of the communication network.

19 Claims, 3 Drawing Sheets

(51) Int. Cl.
   *H04L 43/16* (2022.01)
   *H04L 47/283* (2022.01)
   *H04L 41/5003* (2022.01)

(56) References Cited

U.S. PATENT DOCUMENTS

| | | | |
|---|---|---|---|
| 2015/0049664 A1* | 2/2015 | Gora | H04W 28/021 370/315 |
| 2015/0257024 A1* | 9/2015 | Baid | H04W 24/08 370/338 |
| 2016/0285720 A1* | 9/2016 | Maenpaa | H04L 67/10 |
| 2017/0164404 A1 | 6/2017 | Sundararajan et al. | |
| 2017/0359749 A1 | 12/2017 | Dao | |
| 2020/0107285 A1* | 4/2020 | Prakash | H04W 56/0045 |
| 2020/0145876 A1* | 5/2020 | Dao | H04W 80/10 |
| 2020/0367094 A1* | 11/2020 | Eriksson | H04W 72/1242 |

OTHER PUBLICATIONS

"Update solution #15 for Key issue 6", 3GPP TSG-SA WG2 Meeting #130, S2-1901201, Qualcomm Incorporated, Jan. 21-25, 2019, 2 pages.

"Accurate time stamping based solution for Key issue #6", 3GPP TSG-SA WG2 Meeting #130, S2-1901360, Qualcomm Incorporated, Jan. 21-25, 2019.

"3rd Generation Partnership Project; Technical Specification Group Services and System Aspects; Study on enhancement of 5GS for Vertical and LAN Services (Release 16)", 3GPP TR 23.734, V16.0.0, Dec. 2018, pp. 1-107.

"3rd Generation Partnership Project; Technical Specification Group Core Network and Terminals; General Packet Radio System (GPRS) Tunnelling Protocol User Plane (GTPv1-U) (Release 15)", 3GPP TS 29.281, V15.5.0, Dec. 2018, pp. 1-32.

U.S. Appl. No. 62/806,579, "Method and Apparatus for Handling Redundant Protocol Data Unit Sessions in a Communication System", filed Feb. 15, 2019, 27 pages.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"QoS monitoring based on GTP-U paths", SA2 WG2 Meeting #134, S2-1908295, Nokia, Jun. 24-28, 2019, 7 pages.

"3rd Generation Partnership Project;Technical Specification Group Services and System Aspects;Management and orchestration; 5G performance measurements(Release 16)", 3GPP TS 28.552, V16.4.0, Dec. 2019, pp. 1-159.

International Search Report and Written Opinion received for corresponding Patent Cooperation Treaty Application No. PCT/FI2020/050091, dated May 15, 2020, 15 pages.

"3rd Generation Partnership Project;Technical Specification Group Services and System Aspects;Study on enhancement of Ultra-Reliable Low-LatencyCommunication (URLLC) support in the 5G Core network(5GC) (Release 16)", 3GPP TR 23.725, Draft V16.0.0+, Feb. 2019, pp. 1-87.

Samanta et al., "QoS-Aware Heuristic Scheduling with Delay-Constraint for WBSNs", IEEE International Conference on Communications (ICC), May 20-24, 2018, 7 pages.

"Accumulated packet delay estimation for QoS monitoring and division of PDB", SA WG2 Meeting #131, S2-190207, Nokia, Feb. 25-Mar. 1, 2019, 5 pages.

* cited by examiner

METHOD AND APPARATUS FOR HANDLING PACKET DELAY BUDGET DIVISION AND QUALITY OF SERVICE MONITORING IN A COMMUNICATION SYSTEM

CROSS-REFERENCE TO RELATED APPLICATION

This patent application claims priority from U.S. Provisional Patent Application Ser. No. 62/806,991, titled "METHOD AND APPARATUS FOR HANDLING PACKET DELAY BUDGET DIVISION AND QUALITY OF SERVICE MONITORING IN A COMMUNICATION SYSTEM," filed Feb. 18, 2019, which is incorporated herein by reference in its entirety.

TECHNICAL FIELD

An example embodiment of the present disclosure generally relates to handling packet delay budget (PDB) division and quality of service (QoS) monitoring in a communication system, such as a fifth generation (5G) system.

BACKGROUND 5G communication systems aim to support Ultra-Reliable Low-Latency Communication (URLLC). To provide such URLLC services, in 5G communication systems, end to end (E2E) stringent QoS requirements include very low latency and very high reliability. This poses some challenges to the 5G system as several factors could affect the E2E QoS performance such as wireless coverage, the $3^{rd}$ generation partnership project (3GPP) network node (User Plane Function (UPF)/Radio Access Network (RAN)/User Equipment (UE)) resources, and the transport network. In order to satisfy the requirements of URLLC services, solutions for the specific UE with URLLC services to improve the monitoring of QoS, such as packet delay, jitter and packet error rate to assist in identifying the relevant Network Functions (NFs) and entities need to be provided. In addition, techniques to better control the monitoring of the QoS for URLLC, e.g., techniques to determine whether or not to trigger the above solution(s), need to be provided. Further, there needs to be a technique for flexibly differentiating Core Network (CN) PDB subtraction towards different Protocol Data Unit (PDU) Session Anchor (PSA) UPFs or towards different RAN nodes.

Therefore, a number of issues associated with supporting URLLC in communication systems remain.

BRIEF SUMMARY

A method, apparatus and computer program product are provided in accordance with an example embodiment to handle packet delay budget (PDB) division and quality of service (QoS) monitoring in a communication system, such as a fifth generation (5G) system.

In one example embodiment, a method is provided that includes receiving, at a network node of a communication network, information about an accumulated packet delay in the communication network. The method further includes estimating, by the network node, a next hop transport delay. The method further includes estimating or measuring a processing delay of the network node. The method further includes updating the accumulated packet delay by adding the next hop transport delay and the processing delay to the accumulated packet delay. The method further includes causing transmission of information about the accumulated packet delay to a next hop node of the communication network.

In some implementations of such a method, the information about the accumulated packet delay is included in every packet carrying user data. In some embodiments, the information about the accumulated packet delay is included one or more times in signalling of the user data packet. In some embodiments, the information about the accumulated packet delay is included in a signalling message or a control packet. In some embodiments, the network node is not a first network node of communication path through the communication network. In some embodiments, the method further includes determining a remaining protocol delay budget available for an access network based on the received accumulated packet delay. In some embodiments, the method further includes determining that the accumulated packet delay exceeds a limit set by quality of service requirements and causing transmission of quality of service alert information to a control network function of the communication network.

In another example embodiment, an apparatus is provided that includes processing circuitry and at least one memory including computer program code for one or more programs with the at least one memory and the computer program code configured to, with the processing circuitry, cause the apparatus at least to receive, at a network node of a communication network, information about an accumulated packet delay in the communication network. The computer program code is further configured to, with the at least one processor, cause the apparatus to estimate, by the network node, a next hop transport delay. The computer program code is further configured to, with the at least one processor, cause the apparatus to estimate or measure a processing delay of the network node. The computer program code is further configured to, with the at least one processor, cause the apparatus to update the accumulated packet delay by adding the next hop transport delay and the processing delay to the accumulated packet delay. The computer program code is further configured to, with the at least one processor, cause the apparatus to cause transmission of information about the accumulated packet delay in a header of a packet carrying user data or a control packet in the communication network to a next hop node of the communication network.

In some implementations of such an apparatus, the information about the accumulated packet delay is included in every packet carrying user data. In some embodiments, the information about the accumulated packet delay is included one or more times in signalling of the user data packet. In some embodiments, the information about the accumulated packet delay is included in a signalling message or a control packet. In some embodiments, the network node is not a first network node of communication path through the communication network. In some embodiments, the computer program code is further configured to, with the at least one processor, cause the apparatus to determine a remaining protocol delay budget available for an access network based on the received accumulated packet delay. In some embodiments the computer program code is further configured to, with the at least one processor, cause the apparatus to determine that the accumulated packet delay exceeds a limit set by quality of service requirements and cause transmission of quality of service alert information to a control network function of the communication network.

In another example embodiment, a computer program product is provided that includes at least one non-transitory computer-readable storage medium having computer executable program code instructions stored therein with the computer executable program code instructions comprising program code instructions configured, upon execution, to receive, at a network node of a communication network, information about an accumulated packet delay in the communication network. The computer executable program code instructions comprise program code instructions that are further configured, upon execution, to estimate, by the network node, a next hop transport delay. The computer executable program code instructions comprise program code instructions that are further configured, upon execution, to estimate or measure a processing delay of the network node. The computer executable program code instructions comprise program code instructions that are further configured, upon execution, to update the accumulated packet delay by adding the next hop transport delay and the processing delay to the accumulated packet delay. The computer executable program code instructions comprise program code instructions that are further configured, upon execution, to cause transmission of information about the accumulated packet delay in a header of a packet carrying user data or a control packet in the communication network to a next hop node of the communication network.

In some implementations of such a computer program product, the information about the accumulated packet delay is included in every packet carrying user data. In some embodiments, the information about the accumulated packet delay is included one or more times in signalling of the user data packet. In some embodiments, the information about the accumulated packet delay is included in a signalling message or a control packet. In some embodiments, the network node is not a first network node of communication path through the communication network. In some embodiments, the computer executable program code instructions comprise program code instructions that are further configured, upon execution, to determine a remaining protocol delay budget available for an access network based on the received accumulated packet delay. In some embodiments the computer executable program code instructions comprise program code instructions that are further configured, upon execution, to determine that the accumulated packet delay exceeds a limit set by quality of service requirements and cause transmission of quality of service alert information to a control network function of the communication network.

In another example embodiment, an apparatus is provided that includes means for receiving, at a network node of a communication network, information about an accumulated packet delay in the communication network. The apparatus further includes means for estimating, by the network node, a next hop transport delay. The apparatus further includes means for estimating or measuring a processing delay of the network node. The apparatus further includes means for updating the accumulated packet delay by adding the next hop transport delay and the processing delay to the accumulated packet delay. The apparatus further includes means for causing transmission of information about the accumulated packet delay to a next hop node of the communication network.

In some implementations of such an apparatus, the information about the accumulated packet delay is included in every packet carrying user data. In some embodiments, the information about the accumulated packet delay is included one or more times in signalling of the user data packet. In some embodiments, the information about the accumulated packet delay is included in a signalling message or a control packet. In some embodiments, the network node is not a first network node of communication path through the communication network. In some embodiments, the apparatus further includes means for determining a remaining protocol delay budget available for an access network based on the received accumulated packet delay. In some embodiments, the apparatus further includes means for determining that the accumulated packet delay exceeds a limit set by quality of service requirements and means for causing transmission of quality of service alert information to a control network function of the communication network.

BRIEF DESCRIPTION OF THE DRAWINGS

Figure 1:
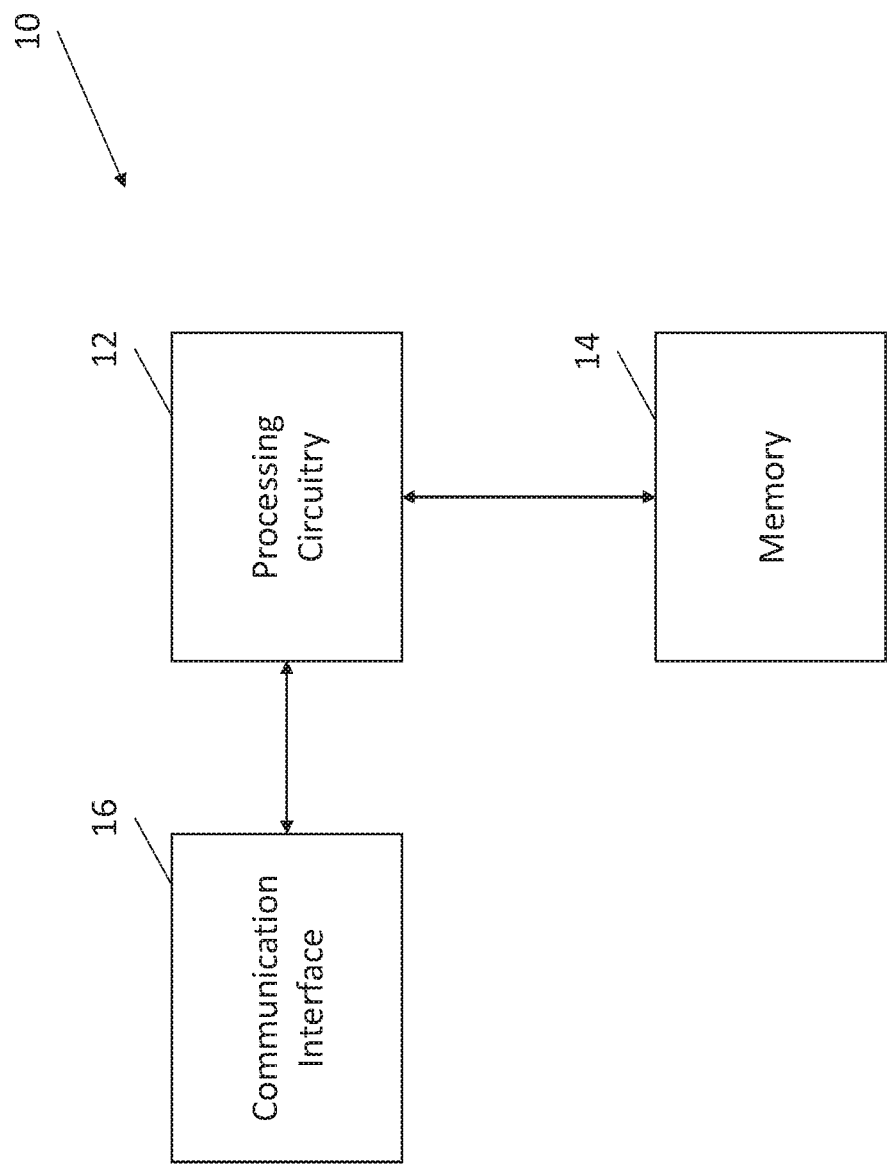
Figure 2:
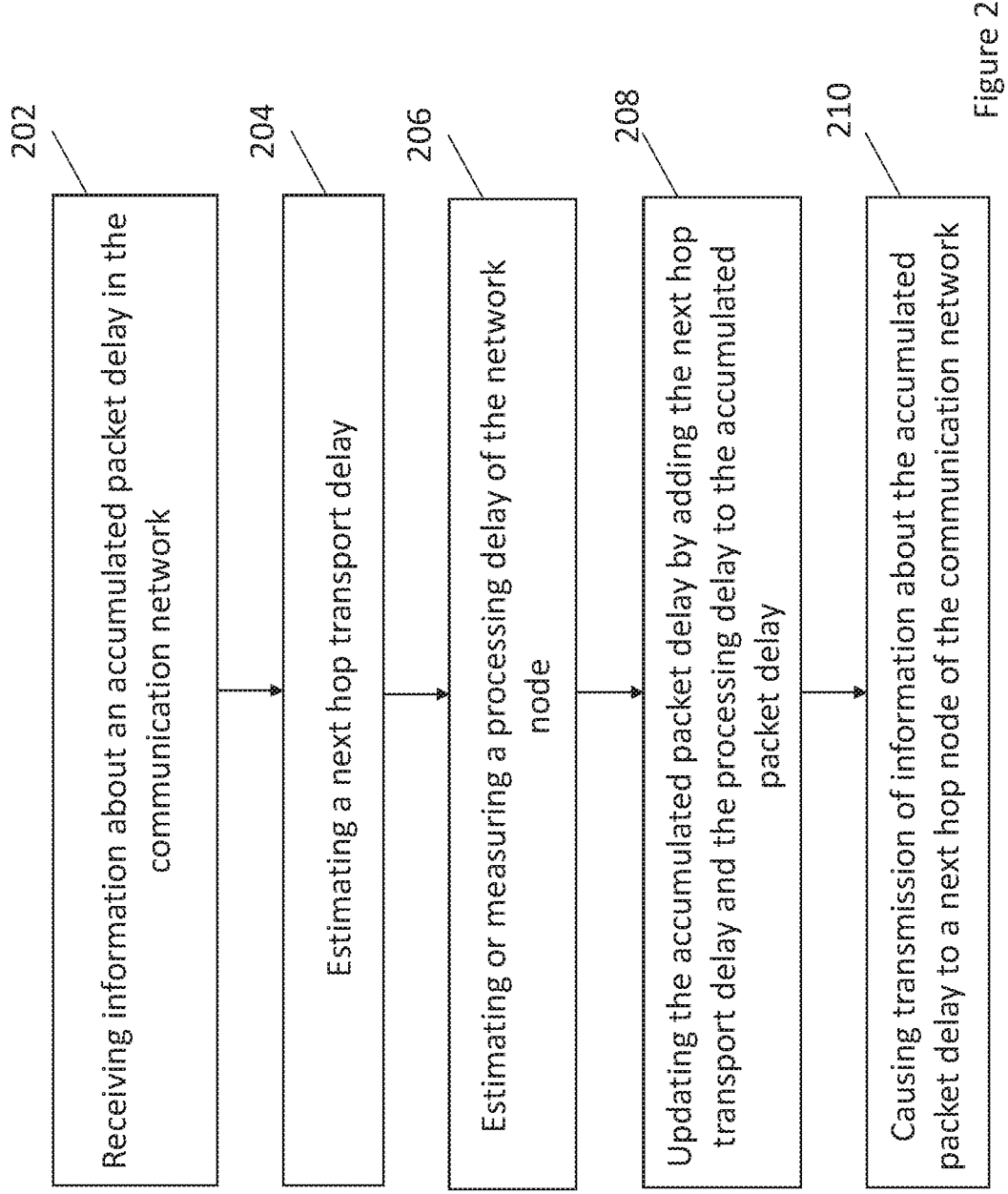
Figure 3:
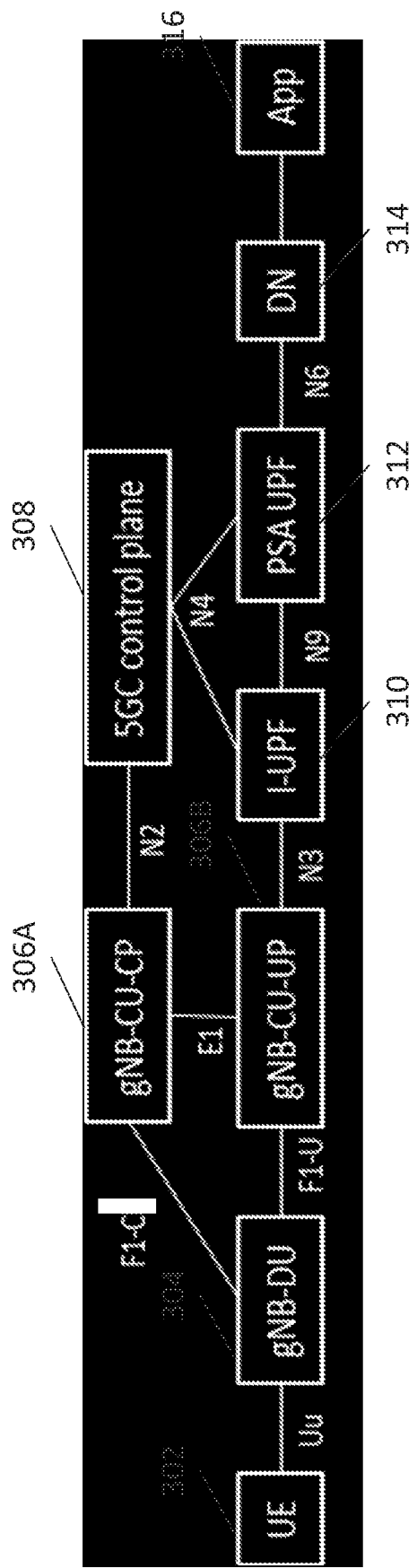

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flowchart illustrating a set of operations performed, such as by the apparatus of FIG. 1, in accordance with an example embodiment of the present disclosure; and FIG. 3 is a diagram illustrating a communication system architecture in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

5G communication systems aim to support Ultra-Reliable Low-Latency Communication (URLLC). To provide such URLLC services, in 5G communication systems, end to end (E2E) stringent QoS requirements include very low latency and very high reliability. This poses some challenges to the 5G System as several factors could affect the E2E QoS performance such as wireless coverage, 3GPP network node (User Plane Function (UPF)/Radio Access Network (RAN)/User Equipment (UE)) resources, and the transport network. In order to achieve requirements of URLLC services, solutions for the specific UE with URLLC services to improve the monitoring of the QoS, such as packet delay, jitter and packet error rate, and identify the relevant Network Functions (NFs) and entities that need to be developed. In addition, techniques to better control the monitoring of the QoS for URLLC, e.g., techniques for determining whether or not to trigger the above solution(s), need to be developed. Further, a technique should be developed for flexibly differentiating Core Network (CN) PDB subtraction towards different Protocol Data Unit (PDU) Session Anchor (PSA) UPFs or towards different RAN nodes.

The 3$^{rd}$ Generation Partnership Project (3GPP) technical report (TR) 23.725 included a number of proposed solutions for QoS monitoring and PDB division. The first configuration operates by introducing a new packet for the purpose of QOS monitoring, e.g. dummy packets, or service packets for the purpose of QOS monitoring. In general, the monitoring procedure requires time synchronization between nodes (RAN, UPF) and measuring of round trip time (RTT) based on time stamps (T1, T2, T5, T6) recorded by the nodes (the RAN, the UPF, etc.). The measurement procedure includes also measuring of delay between the RAN and the UE. A QoS Monitoring Packet (QMP) indicator in the General Packet Radio System (GPRS) Tunnelling Protocol User Plane (GTP-U) header may be introduced and used to signal to the receiving entity that the GTP-U Protocol User Planes PDU (GTP-U PDU) carries a monitoring packet and time-stamps T2 and T5 in the GTP-U header.

The QoS monitoring could be activated dynamically by the 5G control plane (5GC) for certain UEs, a UE group, or a network slice instance, based on the subscription, the request from the application function (AF), the command from the operation, administration, and management (OAM) system, or the like.

During the PDU Session Establishment or Modification procedure, the Policy Control Function (PCF) may send the QoS Monitoring Policy to the session management function (SMF) based on subscription or AF request. The QoS Monitoring policy contains one or more of the QoS parameters to be monitored, event report triggers, the validity timer length for round trip monitoring, the threshold of QoS parameters and the relevant actions when the threshold is exceeded. The QoS Monitoring Policy can also be pre-configured at the SMF by the operator. When receiving the QoS Monitoring Policy from the PCF, a SMF maps the QoS Monitoring Policy in usage reporting rules (URRs) to the UPF. The URRs include the QoS parameters to be monitored, the threshold, the validity timer length for round trip monitoring, relevant actions, and event reporting for specific QoS flows. The SMF notifies the RAN and UE to enable the QoS Monitoring for the QoS flow, such as via a Namf_Communication_N1N2MessageTransfer message and PDU Session Modification Command message.

If monitoring packets in the form of new packets are used, the monitoring packet may be using the same QoS flow as the URLLC service packet data to be monitored. To distinguish the General Packet Radio System (GPRS) Tunnelling Protocol User Planes (GTP-Us) delivering the monitoring packets from the ones delivering the service packets, a new payload type QMP (QoS Monitoring Packet) in the GTP-U header (between the UPF and the RAN) may be introduced.

Alternatively, service packets may be used as monitoring packets. The monitoring packet may be sampled from the service packets of the URLLC service by the UE and the UPF based on the measurement period in the QoS Monitoring policy. If the round trip packet delay is requested to be measured, the UL one way packet delay plus the downlink (DL) one way packet delay could be regarded as being equal to the round trip packet delay. To distinguish the GTP-U packets for QoS Monitoring from the ones delivering the service packets, a new payload type QMP (QoS Monitoring Packet) in the GTP-U header (between the UPF and the RAN) and in the Service Data Adaptation Protocol (SDAP)/Packet Data Convergence Protocol (PDCP) header (between the UE and the RAN) is introduced.

To enable PDB division, several solutions are proposed in TR 23.725. In the first solution proposed, besides the current PDB (e.g., the PDB between the UE and the PSA UPF), the Session Management Function (SMF) will provide the RAN with the PDB between the PSA UPF and the RAN (e.g., PSA-RAN PDB), so that the RAN nodes can take the PDB into account when deriving the Access Network (AN) PDB. The SMF is locally configured by the OAM with the packet delay budgets between a specific RAN node and a PSA UPF (e.g., PSA-RAN PDB) for different 5G quality of service indicators (5Qis). The SMF can provide the RAN with the PSA-RAN PDB for a QoS Flow during the PDU Session Establishment procedure, the PDU Session Modification procedure or the Service Request procedure. Alternatively, the OAM can locally configure the packet delay budgets between a specific RAN node and the PSA UPF for different 5QIs in the RAN node.

In a second solution proposed in another 3GPP contribution that builds on the first solution described above, the public land mobile network (PLMN) operator with the OAM configures locally at the NG-RAN the packet delay budgets between a specific RAN node and the PSA UPF for different 5QIs in the RAN node. The configuration can be based on a variety of inputs: the internet protocol (IP) address of the N3 UPF, the Tunnel Endpoint Identifier (TEID) range, or the like.

In a third solution proposed in another 3GPP contribution, it is assumed that time synchronization using time sensitive networking (TSN) is applied between the RAN and the PSA UPF, as defined in solutions 8 and 11 of TR 23.734. When the Downlink (DL) PDB monitoring is activated, the PSA that is time synchronized using TSN adds the accurate time stamping in the GTP-U header for the DL packets. The SMF activates the PDB monitoring in the PSA according to the request from the PCF or a local policy configured in the SMF. If the PDB monitoring is created by the PCF, the PCF sends the PDB Monitoring policy via a Session Management Policy Modification procedure to the SMF and instructs the SMF to initiate PDB monitoring for the QoS Flow.

The first solution for QoS monitoring and the first solution for PDB division described above require synchronization of network entities, RAN and UPF. Even though the synchronization of the core network (CN), RAN and UE is required for TSN, it is deemed advantageous to allow deployment of URLLC 5G system without the strict time synchronization requirement between the RAN and the CN. Therefore, these two solutions are not optimal.

The second and third solutions described above for PDB division are based on a configuration which is not suitable for cloud deployments and software-defined networking (SDN). Relying on this configuration assumes that placement of the PSA UPF is somewhat fixed and that the underlying network fabric performance changes only insignificantly in the relation to the end-to-end PDB. The solutions also do not consider the case when one or more intermediate UPFs are present in the user plane path. Therefore, these solutions are all non-optimal.

Aiming to provide more flexible solution for QoS monitoring and PDB division for a communications system, such as a 5G system, a method, apparatus and computer program product are provided.

FIG. 1 illustrates an example apparatus that may be provided to embody the various components in a communication system, for example, a network node, a UPF, a Next generation nodeB (gNB), a RAN, or the like. As illustrated in FIG. 1, the apparatus 10 of an example embodiment includes, is associated with or is otherwise in communication with processing circuitry 12, a memory 14, and a communication interface 16.

The processing circuitry 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image processing system) configured to employ an embodiment of the present disclosure by further configuration of the processor by instructions for performing the algorithms and/or operations described herein. The processing circuitry may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 2, the operations performed by a component of the communication system, such as a network node, which may embody the apparatus illustrated in FIG. 1 in accordance with an example embodiment are illustrated.

As shown in block 202, the apparatus 10 of the network node includes means, such as the communication interface 16 and/or the processing circuitry 12, for receiving information about an accumulated packet delay in the communication network. In some embodiments, the receipt of information about the accumulated packet delay is only necessary if the network node is not a first network node in a communication path of the communication network.

As shown in block 204, the apparatus 10 of the network node includes means, such as the processing circuitry 12, for estimating a next hop transport delay. The next hop transport delay may take the form of a round-trip-time of the next hop GTP-U tunnel. The next hop transport delay may be estimated by various methods.

As shown in block 206, the apparatus 10 of the network node includes means, such as the processing circuitry 12, for estimating or measuring a processing delay of the network node. The processing delay may be the time it takes for the network node to process one or more packets and transmit an Echo message to the next network node. The processing delay may be estimated via various different methods.

As shown in block 208, the apparatus 10 of the network node includes means, such as the processing circuitry 12, for updating the accumulated packet delay. In some embodiments, the updating is done by adding the next hop transport delay and the processing delay to the accumulated packet delay.

As shown in block 210, the apparatus 10 of the network node includes means, such as the communication interface 16 and/or the processing circuitry 12, for causing transmission of information about the accumulated packet delay to a next hop node of the communication network. The information may be embedded in a header of a packet carrying user data, a signaling message or a control packet in the communication network.

In some embodiments, the information about the accumulated packet delay is included in every packet carrying user data when the network node is configured to determine the PDB value dynamically. In some embodiments, the information about the accumulated packet delay is included one or more times in signalling of the user data packet carrying if the network node is configured to monitor the QoS. The PDB defines an upper bound for the time that a packet may be delayed while passing through a communication network.

In some embodiments, the apparatus 10 of the network node, for example the next generation Node B (gNB) in a radio access network, further includes means, such as the processing circuitry 12, for determining a remaining protocol delay budget available for a user packet transfer through a network based on the received accumulated packet delay. The remaining PDB may be determined by subtracting the accumulated packet delay from the allowed PDB for the given quality of service indicator, such as a 5G quality of service indicator (5QI), that corresponds to the QoS flow. Alternatively, the estimated next hop transport delay and the current network node's processing time may be subtracted together with the accumulated packet delay from the allowed PDB.

For QoS monitoring, in some embodiments, one or more network nodes are made available for a requested packet delay budget. QoS monitoring is performed by network nodes that store a requested packet delay budget by comparing a received accumulated packet delay with a requested packet delay budget and, in some embodiments, also taking into the account the estimated/measured next hop transmission delay and the node's processing time. If the node determines that the packet delay exceeds the requested packet delay budget then the node of an example embodiment triggers QoS monitoring alert signalling to a control plane network function, e.g. the SMF. A network node may also measure the variation in the estimated/measured next hop transport delay (e.g., the standard deviation of measured/estimated values) and trigger QoS monitoring alert signaling to a control network function, such as by causing transmission of QoS monitoring alert information to the control network function, if the measured variation exceeds the QoS requirements. The measured variation of transport delay may be also sent to a GTP-U receiver in addition to the accumulated packet delay.

Referring now to FIG. 3, an example embodiment of the network described in conjunction with FIG. 2 is further explained with reference to a 5G system architecture diagram, which is provided by way of example, but not of limitation. As illustrated in FIG. 3, the 5G system includes a UE 302, a gNB-Distributed Unit (DU) 304, a gNB-Central Unit (CU)-control plane (CP) 306A and a gNB-Central Unit (CU)-user plane (UP) 306B, a 5G core network control plane 308, an intermediate UPF (I-UPF) 310, a PSA UPF 312, a data network (DN) 314, and an application 316.

The UE 302 is connected to the gNB-DU 304 via the Uu (can be alternatively called radio or air) logical interface. In general a gNB may consist of a gNB-Centralized Unit (gNB-CU) and gNB-Distributed Unit (gNB-DU) and one gNB-DU may include a CP and a UP. The CU processes non-real time protocols and services, and the DU processes physical level protocol and real time services. The gNB-CU and the gNB-DU units are connected via an F1 logical interface. gNB-CU-CP and gNB-CU-UP are connected via E1 logical interface.

gNB-CU-CP 306A is a logical node hosting the radio resource control (RRC) and/or the control plane part of a PDCP protocol of the gNB-CU for a gNB. The gNB-CU-CP terminates the E1 interface connected with the gNB-CU-UP and the F1-C interface connected with the gNB-DU. gNB-CU-UP 306B is a logical node hosting the user plane part of the PDCP protocol and/or the SDAP protocol of the gNB-CU for a gNB. The gNB-CU-UP terminates the E1 interface connected with the gNB-CU-CP and the F1-U interface connected with the gNB-DU.

The I-UPF 310 may be multi-homed to more than one PDU session anchor (PSA). In general, a UPF provides an interconnect point between the mobile infrastructure and the DN 314 and supports, for example, encapsulation and decapsulation of the GTP-U. The UPF may further serve as a PDU session anchor point (PSA-UPF 312) for providing mobility within and between Radio Access Technologies (RATs), including sending one or more end marker packets to the gNB, and packet routing and forwarding, including performing the role of an UL-Classifier (CL) (directing flows to specific data networks based on traffic matching filters). The UPF may further provide application detection using Service Data Flow (SDF) traffic filter templates or a 3-tuple (protocol, server-side IP address and port number) Packet Flow Description (PFD) received from the SMF, and pre-flow QoS handling. gNB-CU-UP 306B is connected to the I-UPF 310 via the N3 interface and the I-UPF 310 is connected to the PSA-UPF via the N9 interface. The 5GC control plane 308 may be connected to the gNB-CU-CP 306A via the N2 interface.

In some embodiments, a GTP-U sender sends an Echo Request message to a GTP-U receiver. In some embodiments, a GTP-U header of the GTP-U PDU carrying the Echo Request message includes a TEID set to value 0 so the GTP-U PDU is not associated with any specific GTP-U tunnel at the network node in FIG. 2, but rather for a GTP-U path, e.g., a network path between two hosts identified by IP addresses.

In some embodiments, a GTP-U receiver may send back an Echo Response message to the GTP-U sender. The GTP-U sender may measure or estimate the round trip time (RTT), which is the time elapsed from the transmission of the Echo Request message to the reception of Echo Response message which may be used as the next hop transport delay. Then the GTP-U sender estimates or measures processing delay at the GTP-U sender. If the GTP-U sender is the PDU session anchor (PSA) UPF, then the GTP-U sender uses a new extension header field that carries information about the accumulated packet delay and sets the value to the sum of the measured (average or worse) RTT/2 and the processing delay. If the GTP-U sender is an intermediate UPF, then an accumulated packet delay value is set to the sum of a received value from an upstream node, the measured or estimated (average or worse) RTT/2 as the next hop transport delay and the processing delay. In the uplink direction, the RAN (gNB or gNB-DU) sets the value to the sum of estimated/measured Uu delay, the gNB/gNB-DU processing delay and the measured RTT to the next hop node (UPF or gNB-CU). The GTP-U sender may include the accumulated packet delay:

a) In every header of the GTP-U PDU sent to the GTP-U receiver (e.g. in every G-PDU);
b) In a header of one or more GTP-U PDUs sent to the GTP-U receiver (e.g. in every G-PDU);
c) In the header of one or more GTP-U PDUs that are sent first to the GTP_U receiver within a given QoS flow;
d) In a header of the GTP-U signaling message; and/or
e) In a new GTP-U signaling message.

In some embodiments, Echo Request message and the Echo Response message are sent outside GTP-U tunnels (if the messages are using TEID set to 0). If the underlying transport is using QoS differentiation (e.g. IP DiffServ) then it is up to the implementation to ensure that the Echo messages are classified correctly and receive very similar treatment by the underlying transport as the GTP-U PDU carrying QoS flows (user data). Alternatively, the GTP-U protocol could be modified to allow for Echo Request and Response messages to be associated with a GTP-U tunnel.

In some embodiments, for example in cases b and c, the receiver GTP-U entity stores the received value of accumulated packet delay and applies the value until an updated value is received. In the downlink direction, for a gNB or gNB-DU, the Uu interface is the last hop to the UE. Therefore, the gNB/gNB-DU may use a received accumulated packet delay and the requested packet delay budget for the given 5QI that corresponds to the QoS flow while determining scheduling decisions. In some embodiments, the gNB uses the accumulated packet delay to determine the 5G-AN part of the PDB. One example way of making such a determination is: 5G-AN part of the PDB=Requested PDB (for the 5QI that corresponds to QoS flow)—accumulated packet delay.

In some embodiments, for the uplink direction, the UPF may use the received accumulated packet delay, current time instant, and scheduled delivery time to determine whether the UPF needs to hold the packet prior to forwarding the packet towards the AF (for example, which may be needed in case of 5G system integration as a Time Sensitive Networking (TSN) bridge and the 5G system may need to adhere to the exact schedule when the 5G system is integrated as a bridge in a TSN network). Such determination may be useful when deterministic QoS is to be supported for time sensitive communication.

An example embodiment of the method, apparatus, and computer program product are flexible by not requiring time synchronization between the network nodes. Additionally, the method, apparatus and computer program product can advantageously be implemented at different protocol layers but the GTP-U implementation can be used between the gNB-DU and the PSA UPF and may cover all of the 3GPP 5GS user plane interfaces except the Uu interface (e.g., the F1-U, N3 and N9 interfaces and also the X2/Xn-U interfaces for dual connectivity scenarios).

As described above, FIG. 2 includes flowchart of an apparatus 10, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 2. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, at a network node of a communication network, information about an accumulated packet delay in the communication network;
   estimating, by the network node, a next hop transport delay;
   estimating or measuring a processing delay of the network node;
   updating the accumulated packet delay by adding the next hop transport delay and the processing delay to the accumulated packet delay;
   causing transmission of information about the accumulated packet delay to a next hop node of the communication network;
   determining a requested packet delay budget for a quality of service indicator corresponding to a quality of service flow of the communication network; and
   determining whether to hold a packet prior to forwarding the packet, based on the accumulated packet delay, a current time instant, a scheduled delivery time, and the requested packet delay budget for the quality of service indicator,
   wherein a determination as to whether to hold the packet is made in a manner independent of time synchronization between a Core Network (CN) and a Radio Access Network (RAN) associated with the communication network, or the time synchronization between a Core Network (CN) and a Radio Access Network (RAN) is not required.

2. A method according to claim 1 wherein the information about the accumulated packet delay is included in every packet carrying user data.

3. A method according to claim 1 wherein the information about the accumulated packet delay is included one or more times in signalling of a user data packet.

4. A method according to claim 1 wherein the information about the accumulated packet delay is included in a signalling message or a control packet.

5. A method according to claim 1 wherein the network node is a user plane function.

6. A method according claim 1, further comprising:
   determining that the accumulated packet delay exceeds a limit set by quality of service requirements; and
   causing transmission of quality of service alert information to a control network function of the communication network.

7. A method according to claim 1 wherein determining whether to hold a packet prior to forwarding the packet is based on a remaining packet delay budget available for an access network, and wherein the remaining packet delay budget is calculated based on the accumulated packet delay and the requested packet delay budget for the quality of service indicator corresponding to the quality of service flow of the communication network.

8. A method according to claim 1, wherein the quality of service indicator is a $5^{th}$ Generation Quality of Service Identifier (5QI).

9. An apparatus comprising processing circuitry and at least one memory including computer program code for one or more programs, the at least one memory and the computer program code configured to, with the processing circuitry, cause the apparatus at least to:
   receive, at a network node of a communication network, information about an accumulated packet delay in the communication network;
   estimate, by the network node, a next hop transport delay;
   estimate or measure a processing delay of the network node;
   update the accumulated packet delay by adding the next hop transport delay and the processing delay to the accumulated packet delay;
   cause transmission of information about the accumulated packet delay to a next hop node of the communication network;
   determine a requested packet delay budget for a quality of service indicator corresponding to a quality of service flow of the communication network; and
   determine whether to hold a packet prior to forwarding the packet, based on the accumulated packet delay, a current time instant, a scheduled delivery time, and the requested packet delay budget for the quality of service indicator,
   wherein a determination as to whether to hold the packet is made in a manner independent of time synchronization between a Core Network (CN) and a Radio Access Network (RAN) associated with the communication network, or the time synchronization between a Core Network (CN) and a Radio Access Network (RAN) is not required.

10. An apparatus according to claim 9 wherein the information about the accumulated packet delay is included in every packet carrying user data.

11. An apparatus according to claim 9 wherein the information about the accumulated packet delay is included one or more times in signalling of a user data packet.

12. An apparatus according to claim 9 wherein the information about the accumulated packet delay is included in a signalling message or a control packet.

13. An apparatus according to claim 12 wherein the network node is a user plane function.

14. An apparatus according to claim 9 where the computer program code is further configured to, with the processing circuitry, cause the apparatus at least to:
   determine that the accumulated packet delay exceeds a limit set by quality of service requirements; and
   cause transmission of quality of service alert information to a control network function of the communication network.

15. A computer program product comprising at least one non-transitory computer-readable storage medium having computer executable program code instructions stored therein, the computer executable program code instructions comprising program code instructions configured, upon execution, to:
- receive, at a network node of a communication network, information about an accumulated packet delay in the communication network;
- estimate, by the network node, a next hop transport delay;
- estimate or measure a processing delay of the network node;
- update the accumulated packet delay by adding the next hop transport delay and the processing delay to the accumulated packet delay;
- cause transmission of information about the accumulated packet delay to a next hop node of the communication network;
- determine a requested packet delay budget for a quality of service indicator corresponding to a quality of service flow of the communication network; and
- determine whether to hold a packet prior to forwarding the packet, based on the accumulated packet delay, a current time instant, a scheduled delivery time, and the requested packet delay budget for the quality of service indicator,
- wherein a determination as to whether to hold the packet is made in a manner independent of time synchronization between a Core Network (CN) and a Radio Access Network (RAN) associated with the communication network, or the time synchronization between a Core Network (CN) and a Radio Access Network (RAN) is not required.

16. A computer program product according to claim 15 wherein the information about the accumulated packet delay is included in every packet carrying user data.

17. A computer program product according to claim 15 wherein the information about the accumulated packet delay is included one or more times in signalling of a user data packet.

18. A computer program product according to claim 15 wherein the information about the accumulated packet delay is included in a signalling message or a control packet.

19. A computer program product according to claim 18 wherein the network node is a user plane function.

* * * * *

UNITED STATES PATENT AND TRADEMARK OFFICE
CERTIFICATE OF CORRECTION

| | |
|---|---|
| PATENT NO. | : 11,522,803 B2 |
| APPLICATION NO. | : 16/792700 |
| DATED | : December 6, 2022 |
| INVENTOR(S) | : David Navrátil et al. |

It is certified that error appears in the above-identified patent and that said Letters Patent is hereby corrected as shown below:

In the Claims

In Column 13, Line 67, Claim 6, delete "A method according claim" and insert -- A method according to claim --, therefor.

Signed and Sealed this
Thirteenth Day of June, 2023

Katherine Kelly Vidal
*Director of the United States Patent and Trademark Office*